J. ENGLISH & E. LAASS.
FLAMBEAUX.
No. 179,177.  Patented June 27, 1876.
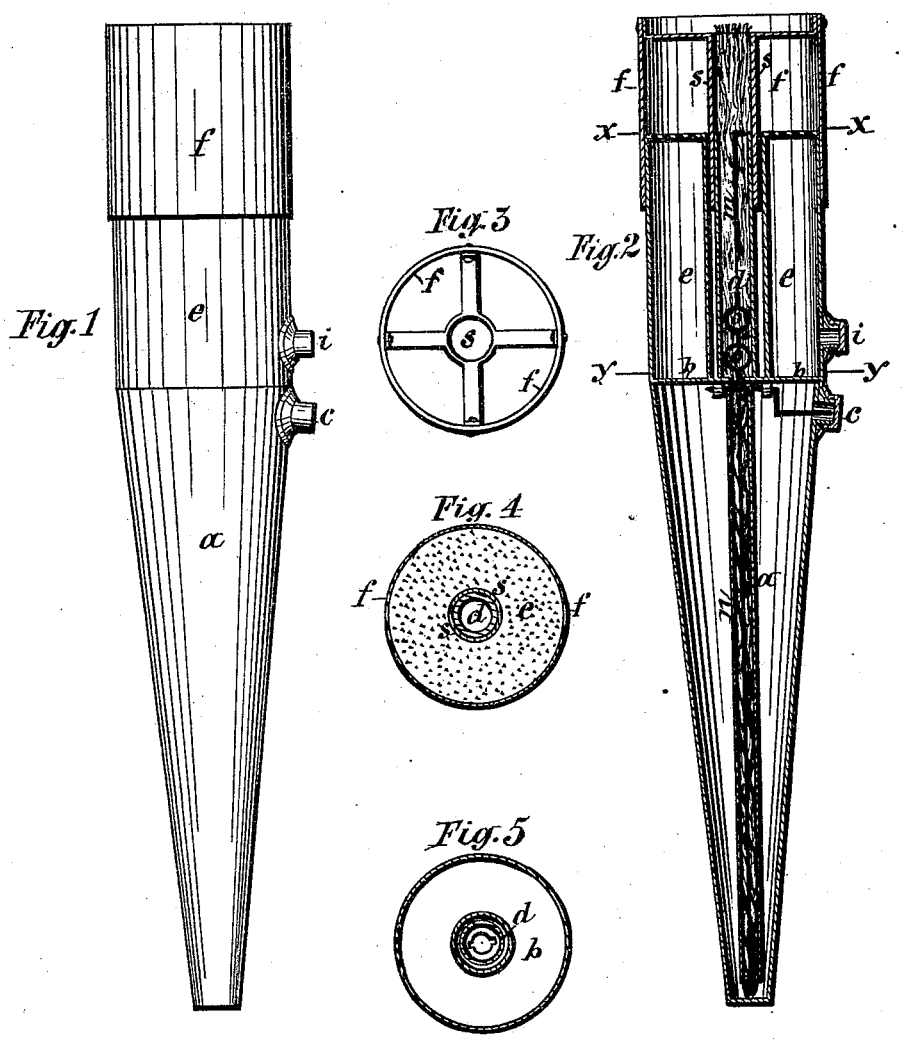
Witnesses:
E Bendipen
D. C. Laass
Inventors:
James x English
  his
  mark
Emil Laass

UNITED STATES PATENT OFFICE.

JAMES ENGLISH AND EMIL LAASS, OF GEDDES, NEW YORK; SAID ENGLISH ASSIGNOR TO SAID LAASS.

IMPROVEMENT IN FLAMBEAUX.

Specification forming part of Letters Patent No. 179,177, dated June 27, 1876; application filed June 9, 1876.

To all whom it may concern:

Be it known that we, JAMES ENGLISH and EMIL LAASS, both of the town of Geddes, in the county of Onondaga and State of New York, have invented new and useful Improvements in Flambeaux, of which the following, taken in connection with the accompanying drawing, is a full, clear, and exact description.

This invention relates to an improved construction, combination, and arrangement of the reservoir for oil or burning-fluid, the chamber for lycopodium or other light inflammable substance, and devices for adjusting and trimming the wick, whereby a flambeau is obtained in which the lycopodium is more effectually protected from being impregnated or dampened by the oil, and more readily brought in contact with the flame, and which also avoids the danger of spilling the oil out of the reservoir in shaking the flambeau, and affords greater facilities for trimming and adjusting the wick.

The invention is fully illustrated in the accompanying drawing, wherein Figure 1 is an exterior side view of the flambeau; Fig. 2, a vertical section of same; Fig. 3, a top view; Fig. 4, a horizontal section on line $x\,x$, in Fig. 2; and Fig. 5, a horizontal section on line $y\,y$ in Fig. 2.

Similar letters of reference indicate corresponding parts.

Hitherto this class of flambeaux consisted of a tapering tube extending the entire length of the flambeau, and was provided at the bottom or small end with an inlet closed by a screw-cap or other removable cover, and at the top with a perforated cover, and in the center of the latter with an inward-extended wick-tube. This main tube was filled with lycopodium, which, by shaking or waving of the tube, was caused to rise through the perforated top and ignite by the flame from the wick, for the purpose of producing glaring flashes of light. This, however, was difficult to accomplish when the lycopodium was near the bottom, because, the flambeau being held at the bottom, the shaking of its top did not agitate the lycopodium sufficiently to produce the desired effect. This construction was considered necessary, in order to bring the lycopodium nearest to the wick-tube, and attempts have been made to combine therewith an oil can or reservoir; but as this necessitates a number of joints directly through and around the lycopodium-tube, it was almost impossible to prevent the oil from entering and wetting the lycopodium.

All these difficulties are overcome by this invention, as will be clearly seen by referring to the accompanying drawing, wherein $a$ represents the oil-reservoir formed of the lower portion of what heretofore constituted the main or lycopodium tube or stem of the flambeau. Instead of having an inlet at the bottom, it is closed there perfectly tight, and the inlet $c$ is placed in the side, preferably near the top. The top is covered with a plate, $b$, which has in its center an orifice somewhat smaller in circumference than the upward-projecting wick-tube $d$ attached to the plate $b$, concentric with the orifice. To the plate $b$ is also attached the lycopodium chamber or box $e$, consisting of two concentric cylinders, the inner one of which is somewhat larger in circumference than the wick-tube, and forms a passage for a sliding wick-tube extension around the stationary wick-tube $d$. The lycopodium-chamber is of even height with the wick-tube and provided with the usual perforated cover on top. Its inlet $i$ is placed near the bottom of its side, so as not to interfere with the sliding sleeve $f$, which is fitted to the exterior of the lycopodium-chamber. The sleeve $f$ carries in its center the sliding wick-tube extension $s$ by radial arms extended from the latter to the former. The wick-tube extension $s$ is fitted to the exterior of the stationary wick-tube $d$, and slides in the passage between the latter and the lycopodium-chamber. This device allows of a ready adjustment of the light without raising or lowering the wick, and at the same time forms an extension of the lycopodium-chamber. It may, however, be dispensed with on flambeaux requiring only a small quantity of lycopodium, or where the appearance of the flambeau is of minor consequence, in which case the lycopodium-chamber may consist of a loose box fitted to slide on the wick-tube $d$, and form the extension thereof by its inner cylindrical shell or casing.

It will be observed that this improved flambeau, by its carrying the oil in the lower portion or stem of the flambeau, the lycopodium is more effectually protected from being dampened by the oil, and the oil prevented from spilling out of the reservoir in shaking the flambeau; also, that it admits of agitating and bringing the lycopodium in contact with the flame more readily than those flambeaux which carry the lycopodium in the main tube or stem thereof. To the bottom of the wick-tube $d$ is attached another tube, $n$, which is extended to the bottom of the oil-reservoir $a$ and filled with a wick for drawing the oil or fluid to the main wick. By means of this tube $n$ the oil or fluid is still further prevented from spilling through the wick-tube in shaking or waving the flambeau. $m$ is a wire, of a length to reach from the top of the wick-tube $d$ to the bottom of the oil-reservoir $a$, and is bent to form two rings, $o\ o$, near each other, above the bottom of the wick-tube $d$, and a loop or ring at the lower extremity. To these rings the wick is attached, and inserted in the tube by means of the wire $m$. In the wick-tube $d$ is attached a wire crosswise at a point to bring it between the two rings $o\ o$ when the wire is inserted, and, by turning the wire partly around, it becomes locked, and is held within the tube.

Having thus described our invention, what we claim is—

1. The combination and arrangement of the oil-reservoir $a$, formed of the lower portion of the main tube or stem of the flambeau, and having on top the upward-projecting wick-tube $d$ and the lycopodium-chamber $e$, either loosely or rigidly attached to the top of the oil-reservoir, substantially in the manner described, for the purpose set forth.

2. The combination, with the lycopodium-chamber $e$ and wick-tube $d$, constructed and arranged as described and shown, of the sliding sleeve $f$ and the wick-tube extension $s$ carried by the sleeve, substantially as and for the purpose specified.

In testimony whereof we have signed our names in the presence of two attesting witnesses, at Syracuse, in the county of Onondaga and State of New York, this 25th day of May, 1876.

JAMES $\overset{\text{his}}{\times}$ ENGLISH.
mark.
EMIL LAASS.

Witnesses:
   Jon. Curt. Akin,
   E. Bendixen.